Sept. 28, 1937.  J. H. BLANKENBUEHLER  2,094,344
DYNAMO-ELECTRIC MACHINE
Filed June 15, 1935  2 Sheets-Sheet 1
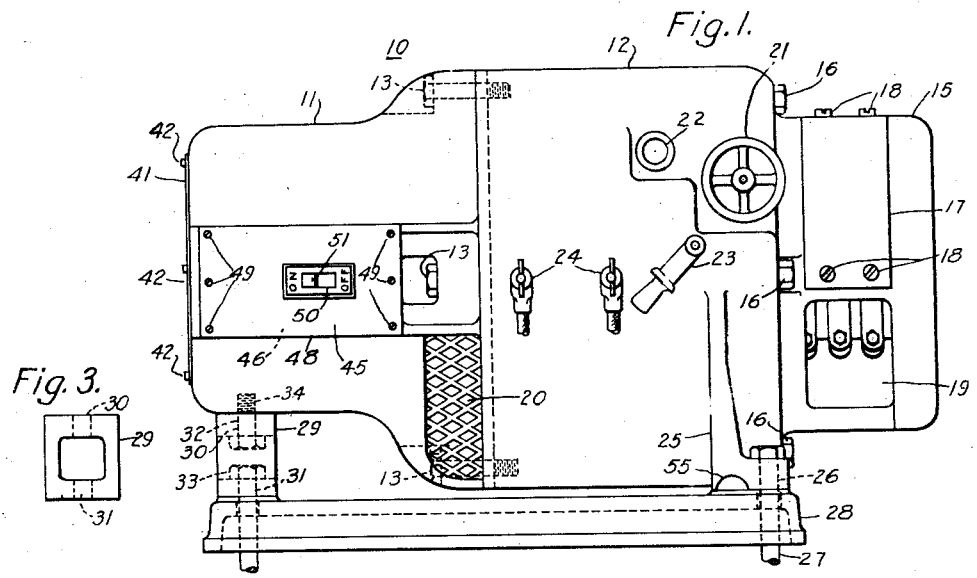
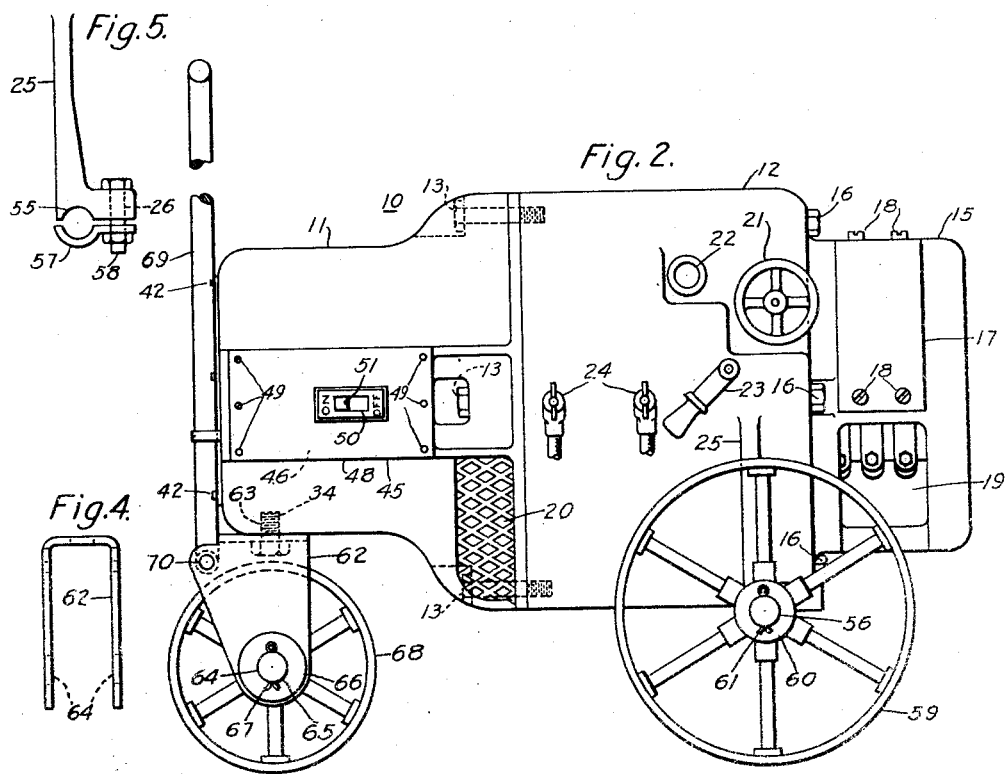
WITNESSES:
INVENTOR
John H. Blankenbuehler
BY
ATTORNEY Sept. 28, 1937.　　　J. H. BLANKENBUEHLER　　　2,094,344
DYNAMO-ELECTRIC MACHINE Filed June 15, 1935　　　2 Sheets-Sheet 2

WITNESSES:

INVENTOR
John H. Blankenbuehler
BY
ATTORNEY

Patented Sept. 28, 1937

2,094,344

UNITED STATES PATENT OFFICE 2,094,344

DYNAMO-ELECTRIC MACHINE

John H. Blankenbuehler, Edgewood, Pa., assignor to Westinghouse Electric & Manufacturing Company, East Pittsburgh, Pa., a corporation of Pennsylvania Application June 15, 1935, Serial No. 26,873

5 Claims. (Cl. 171—123)

My invention relates, generally, to dynamo-electric machines and it has particular relation to the frame construction of motor-generator sets.

The object of my invention, generally stated, is to provide a frame construction for a motor-generator set which shall be simple and efficient and which may be readily and economically manufactured.

An important object of my invention is to provide a universal mounting for a motor-generator set to permit the use of the same frame construction for either bedplate or portable mounting.

Another important object of my invention is to provide for integrally casting a starting switch receptacle in the motor frame of a motor-generator set.

Other objects of my invention will in part be obvious and in part appear hereinafter.

My invention, accordingly, is disclosed in the embodiment hereof shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description, taken in connection with the accompanying drawings, in which:

Figure 1 is a view, in side elevation, showing a bedplate form of mounting for a motor-generator set;

Fig. 2 is a view, in side elevation, of a portable form of mounting for the motor-generator set illustrated in Fig. 1;

Figs. 3, 4 and 5 show certain details of construction for permitting the universal mounting;

Figure 6:
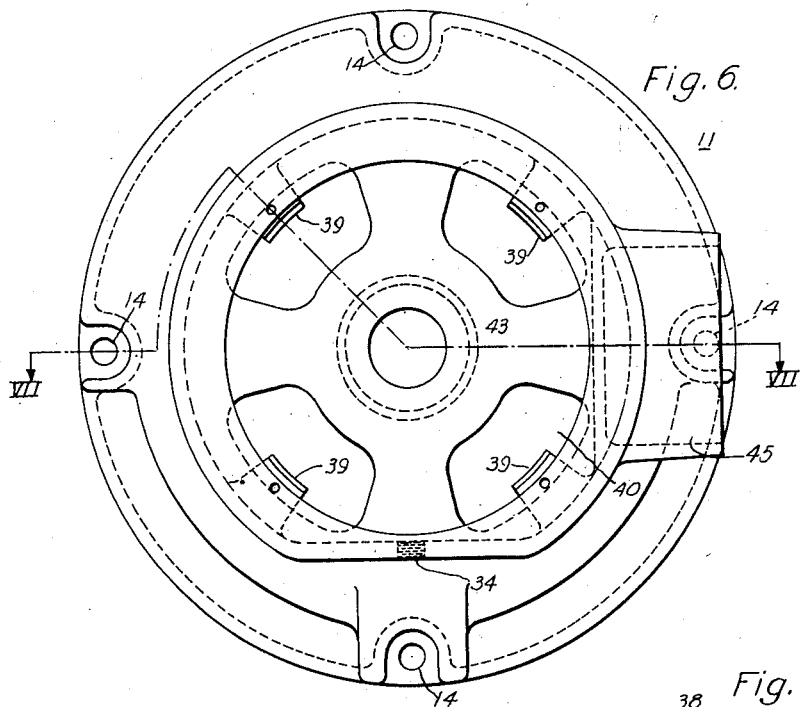
Fig. 6 is an enlarged view, in end elevation, of the motor frame.

Referring now particularly to Fig. 1 of the drawings, the reference character 10 designates generally the frame of a motor-generator set which is particularly adapted for use in arc welding. The frame 10 comprises a motor frame 11 and a generator frame 12. Since the particular construction of the motor and generator do not form a part of the present invention, a detailed showing thereof is deemed to be unnecessary. It will be understood, however, that a suitable motor structure can be provided within the motor frame 11 and, correspondingly, a suitable generator structure can be provided in the generator frame 12. Ordinarily, an alternating-current motor will be provided for operating a direct-current generator.

The motor frame 11 is arranged to interfit with the generator frame 12, and for the purpose of maintaining the two frames in alignment, bolts 13 are provided. As illustrated, the bolts 13 extend through openings 14, Fig. 7, and into tapped holes in the generator frame 12. The righthand end of the generator frame 12 is provided with a commutator frame 15, which may be secured to the generator frame 12 by means of bolts 16. The commutator frame 15 provides a support for the outer bearing of the armature of the generator which is located at its right hand end. As shown, the commutator frame 15 is provided with a cover plate 17, which is secured thereto by means of screws 18. The cover plate 17 is provided for preventing dirt or like material from falling upon the commutator of the generator. The lower portion of the commutator frame, however, is provided with openings 19 to permit the circulation of air for ventilating both the generator and the motor. The motor frame 11 is provided with a grillwork or grating 20 cast integrally therewith to further permit a circulation of air, while guarding against contact with a circulating fan which is positioned inside of the grating.

In order to adjust the output of the generator, a handwheel 21 is provided which is arranged to rotate a dial that may be viewed through a window 22. The operation of the handwheel 21 effects the adjustment of a suitable regulating mechanism. A suitable reversing switch may be operated by means of a handle 23 for reversing the polarity of the terminals 24 of the generator.

The generator frame 12 is of cast construction and has cast integrally therewith a pair of feet 25, one on each side of the frame near the commutator end. Each of the feet 25 is provided with a vertical hole 26 through which bolts 27 may be positioned to secure the feet 25 to a bedplate 28.

Since the motor frame 11 is somewhat smaller in diameter than the diameter of the generator frame 12, a pedestal 29 is provided for supporting the motor frame 11 on the bedplate 28. As shown, the pedestal 29 is provided with upper and lower openings 30 and 31 through which bolts 32 and 33 may be respectively positioned to secure the pedestal 29 to the under side of the motor frame 11 and to the bedplate 28. It will be observed that the bolt 32 is positioned in a tapped opening 34 on the under side of the motor frame 11.

Figure 7:
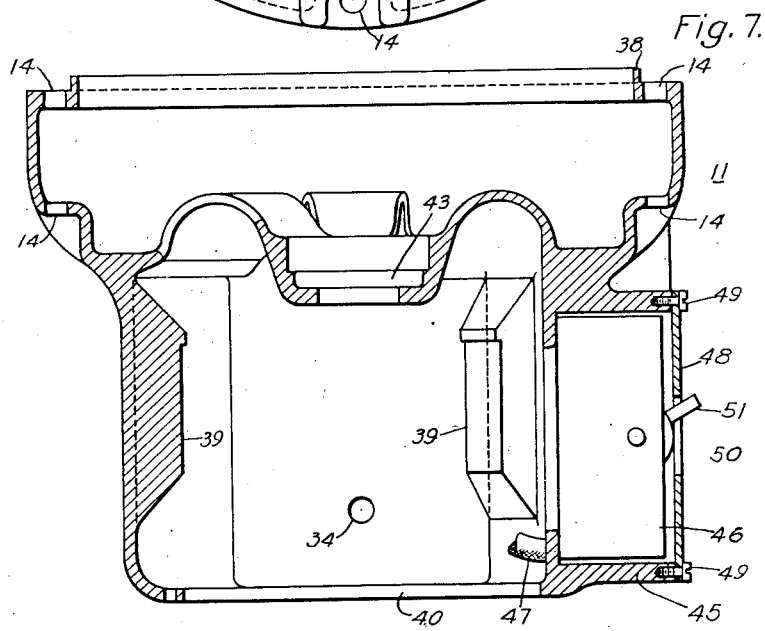
Fig. 7 is a sectional view taken along the line VII—VII of Fig. 6.

Referring now particularly to Figs. 6 and 7 of the drawings, it will be observed that the motor frame 11 is provided with a circumferential tongue 38 which is arranged to interfit with a corresponding groove in the generator frame 12. As set forth hereinbefore, the two frames are secured in aligned relationship by means of the bolts 13. The motor frame 11 is of cast construction for the purpose of reducing the cost thereof to a minimum when the frames are manufactured on a production basis.

In order to support the field structure, not shown, of the alternating-current motor which is used to drive the direct-current generator, bosses 39 are cast integrally with the frame 11. It will be readily understood that it is only necessary to machine the inner surfaces of the bosses 39 in order to secure the proper alignment of the field structure. The field structure may be positioned in the motor frame 11 through an opening 40. A cover plate 41, Fig. 1, is provided for covering the opening 40, and is secured to the motor frame 11 by means of bolts 42. A single bearing support 43 is provided near the end of the motor frame 11 adjacent to the generator frame 12 for the purpose of supporting a bearing which is common to both the motor and the generator.

In order to further reduce the manufacturing cost of the complete motor-generator set, a starting switch box 45 is cast integrally with the motor frame 11. As illustrated, the switch box 45 has positioned therein a starting switch 46, which may be of any suitable type and which may be arranged to connect the operating windings of the field structure of the alternating-current motor to a suitable source of alternating current. A cable 47 is indicated as leading to the windings of the field structure of the alternating-current motor. A cover plate 48 is secured to the starting switch box 45 by means of screws 49 and is provided with an opening 50 through which an operating handle 51 of the starting switch 46 may project.

Referring now particularly to Fig. 2 of the drawings, it will be observed that the motor-generator frame 10 shown in Fig. 1 is arranged for portable mounting. However, the same motor frame 11 and generator frame 12, as illustrated in Fig. 1, are used, since their construction with the addition of certain features readily permits the mountings to be interchanged.

As illustrated in Fig. 5 of the drawings, the feet 25 are provided on the under surfaces thereof with transverse aligned grooves 55, in which a shaft 56 may be positioned and secured therein by means of clamps 57 and bolts 58. At each end of the shaft 56, a wheel 59 is rotatably mounted. A washer 60 and a cotter pin 61 is provided at each end of the shaft 56 for maintaining the wheels 59 on the shaft 56.

When the frame 10 is arranged for portable use, the pedestal 29, shown in Figs. 1 and 3, may be dispensed with, and instead, a yoke 62 is provided which may be secured by means of a bolt 63 in the threaded opening 34. The bolt 63 is so arranged as to permit the yoke 62 to rotate about it as an axis. The yoke 62 is provided with transverse aligned openings 64, in which a short shaft 65 may be located. A washer 66 and a cotter pin 67 are provided at each end of the short shaft 65 in order to secure it in position. A wheel 68 is rotatably mounted on the short shaft 65, as illustrated, the lower surface thereof being arranged to be in the same plane as the lower surface of the wheels 59. In order to readily permit the motor-generator set to be drawn from place to place, a handle 69 is provided and is pivotally secured to the yoke 62 by means of a bolt 70.

It will be understood that the same frame construction for the motor-generator set for either portable or stationary mounting may be employed. It is only necessary to provide the pedestal 29 in addition to the frames 11 and 12 for mounting the set on a bedplate. If the portable construction is desired, the pedestal 29 may be dispensed with and the wheels 59 and 68 may be provided. The transverse aligned grooves 55 may be cast in the feet 25 regardless of whether the set is to be ultimately used for portable or stationary mounting.

Since the motor frame 11 is further provided with the integrally cast starting switch receptacle, it is unnecessary to provide a separate and individual mounting for it. Furthermore, the starting switch 46 will be completely protected by the inherently rugged construction which is afforded by its being integrally cast with the motor frame 11.

Since certain further changes may be made in the foregoing construction and different embodiments of the invention may be made without departing from the scope thereof, it is intended that all matter set forth in the foregoing description or shown in the accompanying drawings shall be interpreted as illustrative and not in a limiting sense.

I claim as my invention:

1. A frame for a motor-generator set comprising, in combination, a cast frame for the generator, a pair of feet integrally cast with said generator frame on opposite sides thereof, a cast frame for the motor having a diameter smaller than the diameter of said generator frame and disposed to interfit therewith, a receptacle for a starting switch cast integrally with and opening outwardly from said motor frame, means for securing said frames in alignment, and a pedestal disposed underneath said motor frame to permit the mounting of said frames on a common bedplate.

2. A frame for a motor-generator set comprising, in combination, a cast frame for the generator, a pair of feet integrally cast with said generator frame on opposite sides and at one end thereof, a cast frame for the motor having a diameter smaller than the diameter of said generator frame and disposed to interfit therewith at the other end thereof, a receptacle for a starting switch cast integrally with and opening outwardly from said motor frame, means for securing said frames in alignment, a pedestal disposed underneath said motor frame near the outer end thereof having its bottom surface in alignment with the bottom surfaces of said feet, and means for securing said pedestal to said motor frame.

3. A frame for a motor-generator set comprising, in combination, a frame for the generator, a pair of feet integrally formed with said generator frame on opposite sides thereof, a transverse groove in the undersurface of each of said feet, a shaft in said grooves, clamping means for securing said shaft in said grooves, a wheel mounted on each end of said shaft, a frame for the motor disposed to interfit with said generator frame, a yoke secured to the under side of said motor frame, a short shaft extending transversely through said yoke, a wheel mounted on said short shaft within said yoke, and a handle pivotally mounted on said yoke.

4. A frame for a motor-generator set comprising, in combination, a cast frame for the generator, a pair of feet integrally cast with said generator frame on opposite sides thereof, a transverse groove in the undersurface of each of said feet, a shaft in said grooves, clamping means for securing said shaft in said grooves, a wheel mounted on each end of said shaft, a cast frame for the motor disposed to interfit with said generator frame, a receptacle for a starting switch cast integrally with and opening outwardly from said motor frame, a yoke secured to the under side of said motor frame, a short shaft extending transversely through said yoke, a wheel mounted on said short shaft within said yoke, and a handle pivotally mounted on said yoke.

5. A frame for a motor-generator set comprising, in combination, a cast frame for the generator, a pair of feet integrally cast with said generator frame on opposite sides thereof, a pair of transverse aligned grooves in the undersurfaces of said feet, a cast frame for the motor disposed to interfit with said generator frame, a receptacle for a starting switch cast integrally with and opening outwardly from said motor frame, means for securing said frames in alignment, and means disposed on the under side of said motor frame to secure thereto mounting means for cooperating with said feet to maintain the longitudinal axis of the motor-generator set in a substantially horizontal plane.

JOHN H. BLANKENBUEHLER.